United States Patent [19]
Azuma et al.

[11] Patent Number: 5,335,496
[45] Date of Patent: Aug. 9, 1994

[54] AXLE DRIVING APPARATUS

[75] Inventors: Toshiro Azuma; Kazuhiko Yano; Koichiro Fujisaki, all of Amagasaki, Japan

[73] Assignee: Kanzaki Kokyukoki Mfg. Co. Ltd., Amagasaki, Japan

[21] Appl. No.: 864,932

[22] Filed: Apr. 7, 1992

[30] Foreign Application Priority Data

Dec. 18, 1991 [JP] Japan .................. 3-335226

[51] Int. Cl.$^5$ .............................. F16D 39/00
[52] U.S. Cl. .................... 60/487; 91/505; 92/12.2; 92/57; 92/71
[58] Field of Search ........... 60/487, 488, 489, 491, 60/492; 91/504, 505; 92/12.2, 57, 71; 417/218, 269; 74/60

[56] References Cited

U.S. PATENT DOCUMENTS

| | | | |
|---|---|---|---|
| 4,870,820 | 10/1989 | Nemoto | 60/487 |
| 4,903,545 | 2/1990 | Louis et al. | |
| 4,905,472 | 3/1990 | Okada | 60/487 X |
| 4,922,787 | 5/1990 | Fujisaki et al. | 60/487 X |
| 4,932,209 | 6/1990 | Okada et al. | |
| 4,979,583 | 12/1990 | Thoma et al. | |
| 4,986,073 | 1/1991 | Okada | |
| 5,067,933 | 11/1991 | Hardesty et al. | 60/487 X |
| 5,078,659 | 1/1992 | Kaler et al. | 60/487 X |
| 5,156,576 | 10/1992 | Johnson | 475/72 |

FOREIGN PATENT DOCUMENTS 64-4520 1/1989 Japan.
805771 12/1958 United Kingdom ............. 60/487

Primary Examiner—Edward K. Look
Assistant Examiner—Hoang Nguyen
Attorney, Agent, or Firm—Sterne, Kessler, Goldstein & Fox

[57] ABSTRACT

An axle driving apparatus which is so constructed that an input pulley for engine power is set lower in mounting position with respect to the axis of a driving axle so s to enable the platform of a vehicle to be lowered. The engine position lowers to promote miniaturization, a lower center of gravity and running stability of the vehicle. For maintenance of the transmission for driving the axle, the entire axle driving apparatus need not be removed from the frame of the vehicle. A bearing for supporting the axle to the casing is held with exact dimensional precision so as not to cause a backlash on the axle, to thereby prolong the life span of the bearing. The axle is ensured to be sealed, the number of mounting bolts for the casing need not be increased in order to improve rigidity, and the casing is strong so that the assembly time for the axle driving apparatus is minimized.

19 Claims, 17 Drawing Sheets

AXLE DRIVING APPARATUS

FIELD OF THE INVENTION

The present invention relates to an axle driving apparatus for a running vehicle, which includes a hydraulic non-stage transmission disposed within a casing which steplessly changes the rotation speed from an input shaft. The rotation of the transmission, after the speed change, drive the axles.

BACKGROUND OF THE INVENTION

Conventionally, a hydraulic non-stage transmission and axle driving apparatus housed in a casing is well known, as disclosed in, for example, U.S. Pat. Nos. 4,932,209 and No. 4,986,073.

Such axle driving apparatus has been used mainly in small-sized vehicles, such as a mower tractor loading thereon a vertical type engine. In such a construction, the casing of the axle driving apparatus is formed by joining two main casing halves with each other, the junction surface therebetween is incidental with a plane including the longitudinal axis of the axles.

As a result, the above-mentioned vehicle has the following disadvantages:

First, an input pulley for inputting engine power to the axle driving apparatus is mounted high with respect to the axis of the driving axle so as to restrict the height of a platform for the vehicle. Hence, the platform cannot be low, which hinders the ability to miniaturize the vehicle. On the other hand, when a single belt transmission mechanism is used to couple the engine with the axle driving apparatus, the engine is positioned high to correspond to the position of the input pulley, whereby the vehicle has a high center of gravity, which affects the running stability of the vehicle.

Second, for maintenance of the transmission mechanism, such as a hydraulic non-stage transmission housed in the casing, if the casing is dismantled, the axles are also dismantled together therewith, whereby the axle driving apparatus itself should be removed from a frame, thereby causing much trouble.

Third, a bearing for supporting the axle to the casing is held in part to the respective casing halves. However, in the case where the respective casing halves are molded by an aluminum die-cast or the like, it is difficult to exactly obtain dimensional precision of the part holding the bearing. As the result, the axle can easily cause a backlash, the life span of the bearing is reduced, and oil may leak from a sealing portion of the axle.

Fourth, each casing half bears a load applied to the axle, so that the number of mounting bolts for the casing is increased to increase its rigidity, thereby requiring much time to assemble the axle driving apparatus.

SUMMARY OF THE INVENTION

An object of the present invention is to provide an axle driving apparatus in which the mounting position of the input pulley for engine power is provided lower. Thus, the platform of the vehicle and the engine can be lowered to thereby promote miniaturization, a low center of gravity and running stability of the vehicle.

For maintenance of the hydraulic non-stage transmission or the like housed in the casing for driving the axles, the axle driving apparatus need not be removed from the frame of vehicle each time it is inspected for maintenance. Also, the bearings for supporting the axles are held to the casing with exact dimensional precision so that the axles cause no backlash, the life span of the bearings is improved and the axles are ensured to be sealed. Furthermore, the number of mounting bolts for the casing need not increase in order to increase the rigidity and the casing is of strong rigidity to thereby save time in assembly.

DESCRIPTION OF THE PREFERRED EMBODIMENT

Figure 1:
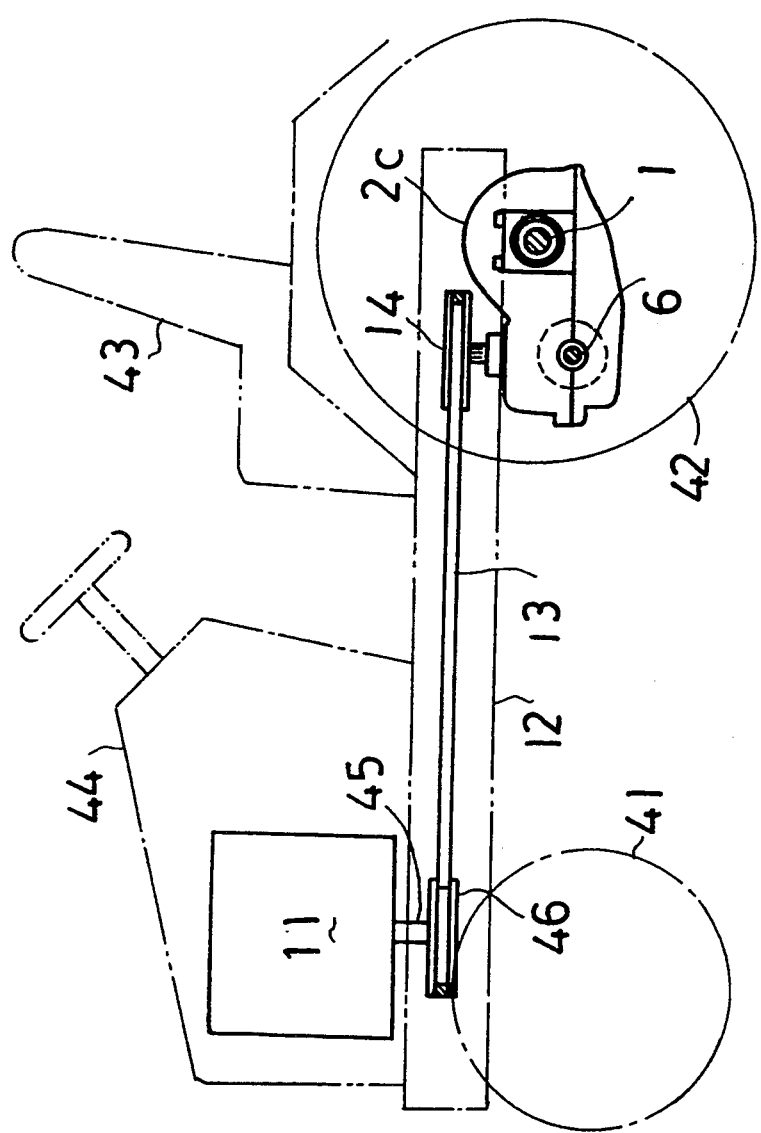
FIG. 1 is a side view of a vehicle loading thereon a first embodiment of an axle driving apparatus of the present invention.
Figure 2:
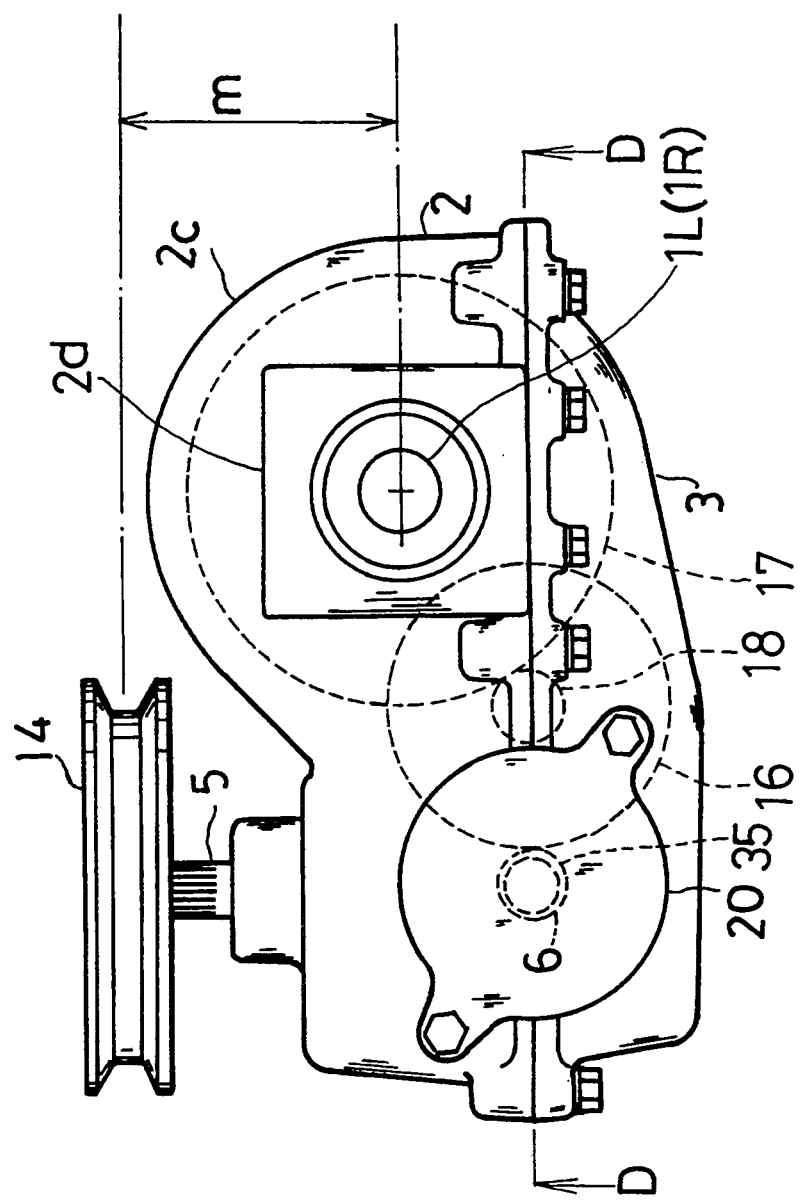
FIG. 2 is a side view of the axle driving apparatus of the present invention.

In FIGS. 1 and 2, within a bonnet 44 of a vehicle is disposed a vertical type engine 11 whose engine output shaft 45 is vertically disposed. A pulley 46 is fixed to the engine output shaft 45. Input pulley 14 is fixed to an input shaft 5 projecting from a casing M of the axle driving apparatus. A belt transmission mechanism 13 is disposed between both pulleys 46 and 14, thereby transmitting engine power to the axle driving apparatus. Within casing M is housed a hydraulic non-stage transmission (including input shaft 5 and output shaft 6), an axle 1, and a gear for connecting the transmission and axle 1 in association therewith. Casing M is filled with operating oil for the hydraulic non-stage transmission.

The engine 11 is disposed at the front of a body frame 12. The casing M hangs downwardly from the rear of body frame 12 through mounting brackets 2d. Driving wheels 42 are fixed to axles 1 laterally projecting from the casing M. In addition, front steering wheels 41 and a seat 43 are also shown. In the embodiment in FIG. 1, engine 11 is of a vertical type which vertically disposes the engine output shaft 45, so that belt transmission mechanism 13 is used to transmit power to the laterally disposed casing M. In the alternative, when the engine output shaft 45 is positioned horizontally, a power transmitting shaft using a universal joint may be provided to transmit the power to input shaft 5 which horizontally projects from vertically disposed casing M.

Figure 3:
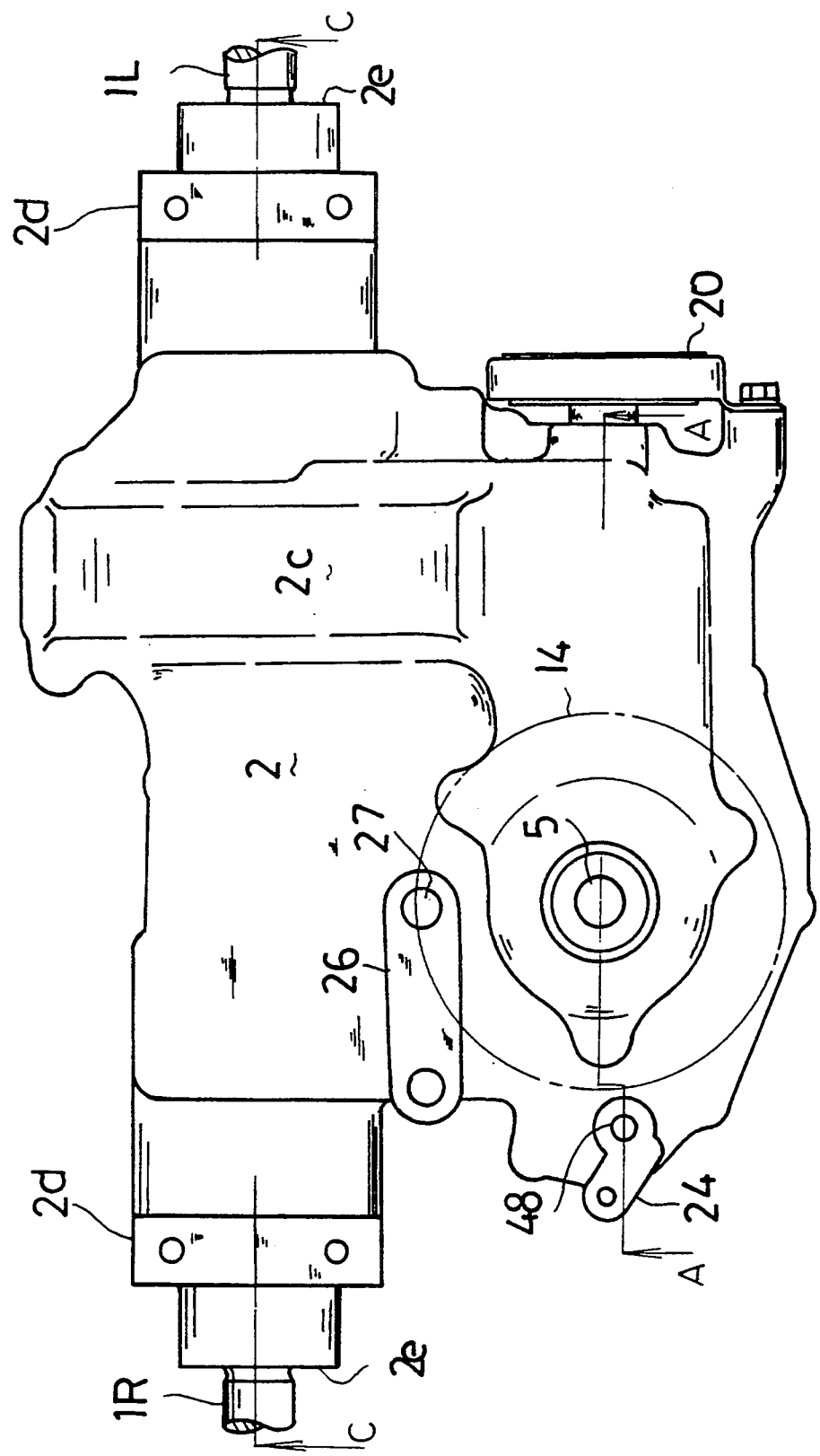
FIG. 3 is a plan view thereof.

Casing M is formed by joining at least one casing half 2 with another casing half 3. The axis of output shaft 6 of the hydraulic non-stage transmission and that of axle 1 are disposed within casing M. The plane including the axis of output shaft 6 is coincident with the junction surface D—D casing halves 2 and 3 of casing M. Output shaft 6 is journalled at the junction portion. The axis of axle 1 is not positioned at the junction surface D—D, but is positioned at a side of casing half 2. An axle housing 2e is integrally provided outside casing half 2. Axle 1 is rotatably supported at the outside or distal end thereof to housing 2e through a bearing 40. Mounting brackets 2d are provided at the upper and lower surfaces of axle housing 2e so as to fix housing 2e to body frame 12 of the vehicle from the upper or lower surface thereof. In addition, a cover 20 is provided for a braking device provided at the utmost end of output shaft 6. Referring to FIG. 3, a speed change operating arm 26 is fixed to a speed change operating shaft 27 upwardly projecting from the upper surface of casing half 2. A by-pass valve operating arm 24 is fixed to a by-pass valve operating shaft 48.

Figure 4:
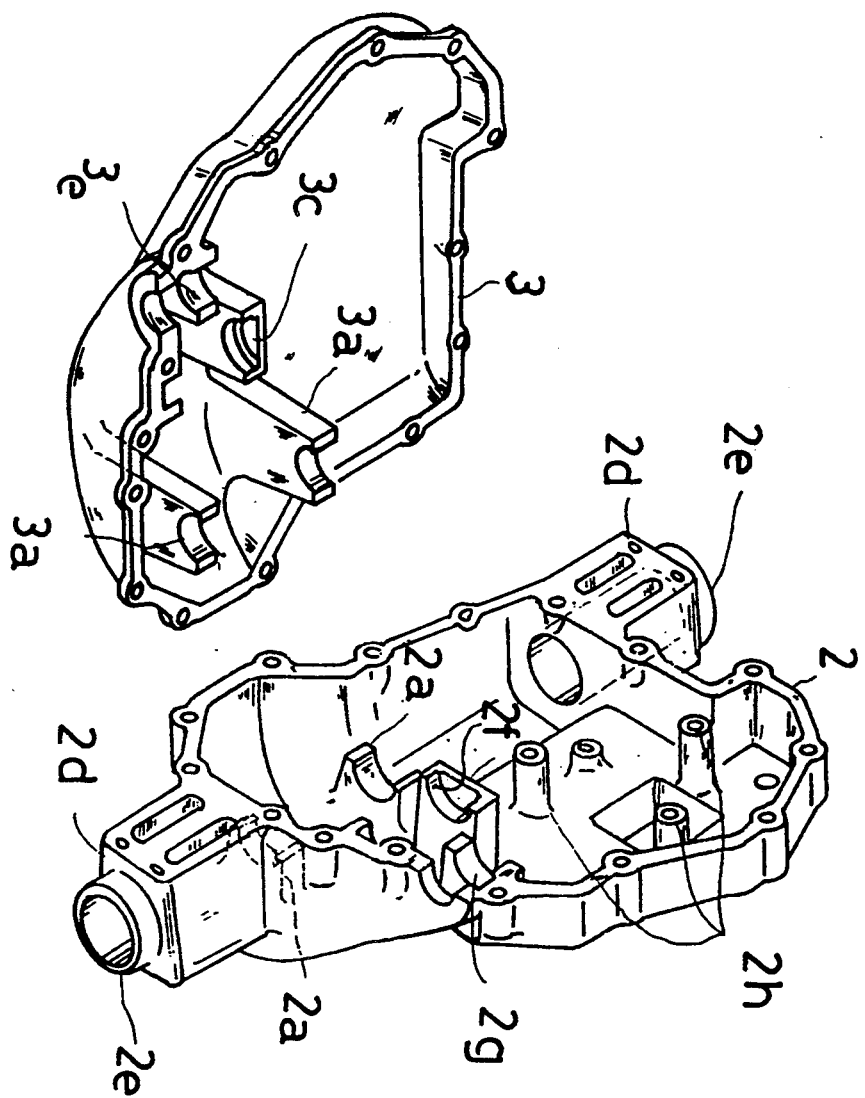
FIG. 4 is a perspective view of a casing M, which is separated into a casing half 3 and a casing half 2.

In FIG. 4, the casing M is shown separated into casing halves 2 and 3. As shown in FIG. 1, where casing M is mounted to body frame 12, casing half 2 is upwardly mounted and casing half 3 is downwardly mounted. A pair of projections 3a, for supporting axle 1 from below at the inside portion thereof through bearings 39, project upwardly beyond junction surface D—D. Within casing half 2, a pair of holders 2a for supporting the axle 1 at the inside or proximal portion thereof through the bearings 39 are formed downwardly before the junction surface D—D. Swollen or enlarged regions or portions 3c and 2f for supporting bearings for a counter shaft 15 project close to junction surface D—D of casing M. Bosses 2h for mounting therethrough a hydraulic non-stage transmission project from the casing half 2 to the position of junction surface D—D. Supports 3e and 2g for supporting a bearing for output shaft 6 project to the junction surface D—D. Mounting brackets 2d at the axle housings each are formed in a plane level with junction surface D—D of casing M.

Figure 5:
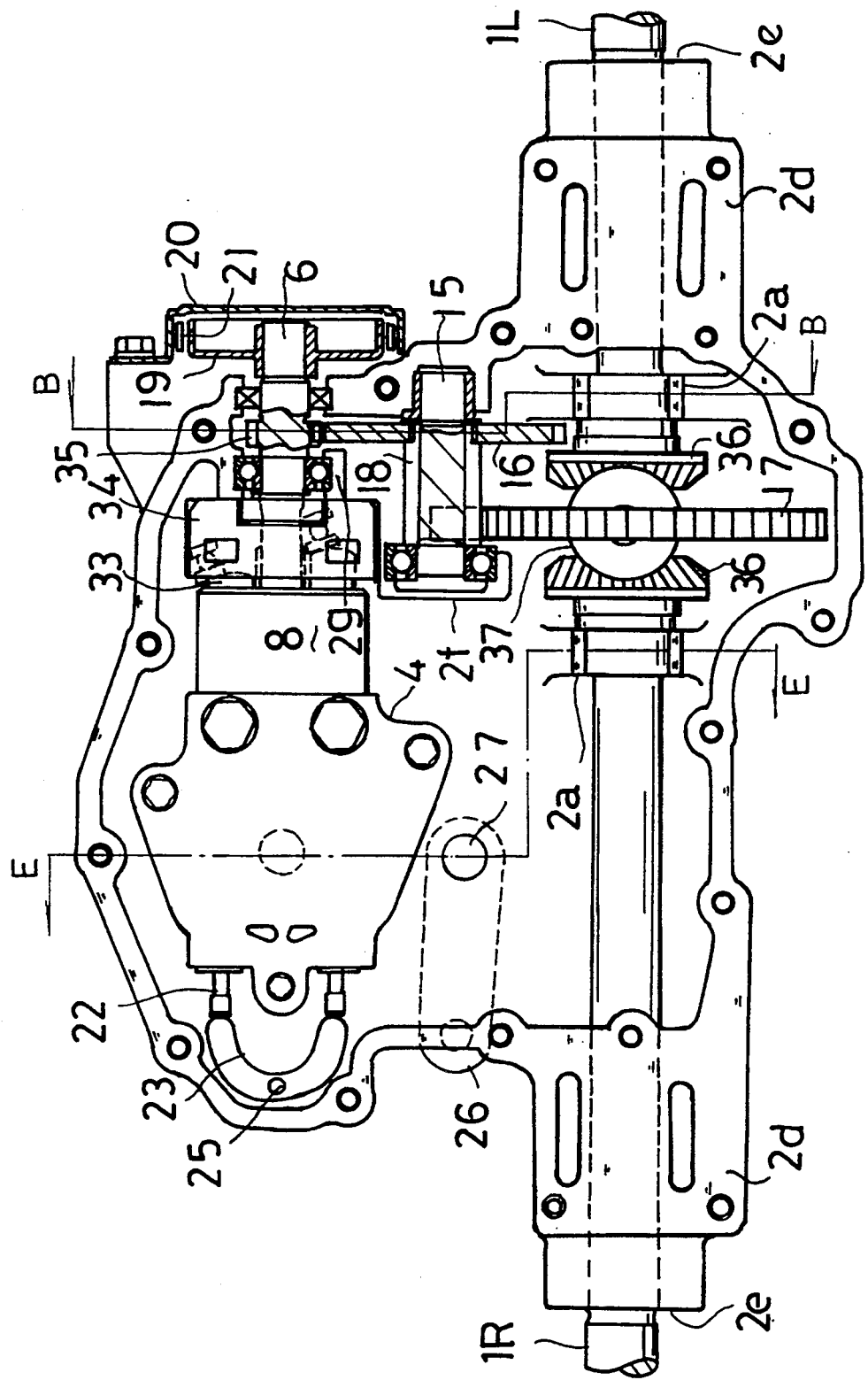
FIG. 5 is a plan view showing the interior of casing half 2 from which casing half 3 has been separated along the junction plane D—D in FIG. 2.
Figure 6:
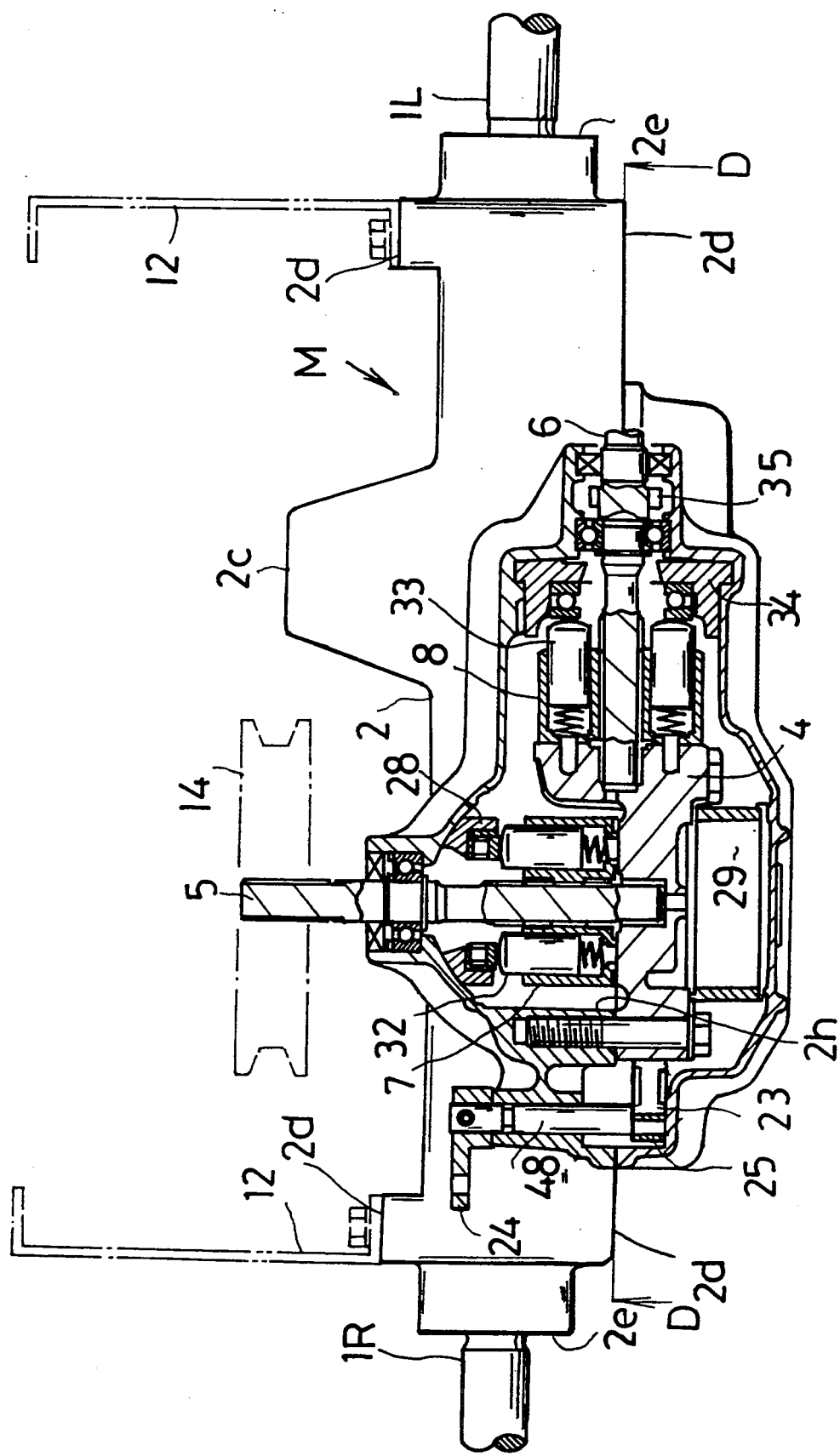
FIG. 6 is a sectional view taken on the line A—A in FIG. 3.

Referring to FIG. 5, the casing M is shown from which casing half 3 has been removed, and casing half 2 is shown as viewed from below. Within casing half 2, a manifold 4 for the hydraulic non-stage transmission is fixed to the bosses 2h through bolts. The manifold 4 connects a hydraulic pump and a hydraulic motor through a closed circuit so as to constitute a hydraulic non-stage transmission. Manifold 4 is nearly L-like-shaped as shown in FIG. 6. The hydraulic pump, which is mounted on the upper surface of manifold 4, is not shown in FIG. 5. Meanwhile, a cylinder block 8 of the hydraulic motor is mounted at the side surface of manifold 4. Output shaft 6 integral with the cylinder block 8, is supported by support 2g through a bearing. A gear 35 is formed at an intermediate portion of output shaft 6. A drum-like braked rotary member 19 is fixed to the utmost end of output shaft 6, projecting outwardly from casing M. Around the braked rotary member 19 is provided a band-like braking member 21 press-contactable with the braked rotary member 19.

A countershaft 15, provided with a larger diameter gear 16 engageable with gear 35 and a smaller diameter gear 18, is disposed at swollen portion 2f.

A differential gear, including a ring gear 17 engageable with smaller diameter 18, is housed in casing half 2. The differential gear comprises a pair of pinions 37 mounted integrally with ring gear 17 and a pair of side gears 36 engageable with pinions 37.

A pair of axles 1 are inserted into casing half 2 through axle housings 2e and are held at the inside portion thereof and abut at their utmost ends against each other and at the same time engage with side gears 36, respectively.

In addition, a pair of by-pass operating valves 22 project from manifold 4. A horse-shoe type operating member 23 is disposed in front of the operating valves 22. Operating member 23 is retained to an eccentric operating shaft 25 mounted to the by-pass valve operating shaft 48 so that a by-pass valve operating arm 24 is optionally rotated to move the operating member 23. As the pair of by-pass operating valves 22 are depressed, they enable operating oil to be discharged from the closed circuit in the manifold 4 to casing M.

Figure 9:
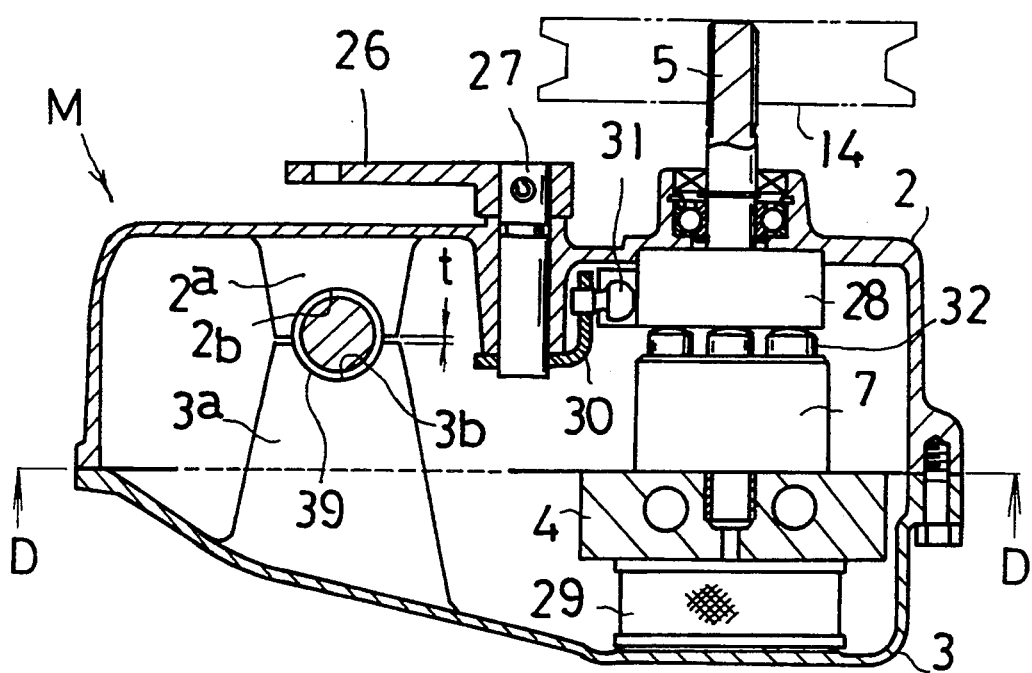
FIG. 9 is a sectional view taken on the line E—E in FIG. 5.

As shown in FIG. 6, at the junction surface D—D of casing half 2 and casing half 3, manifold 4 is fixed from below to boss 2h. At the upper surface of manifold 4 is supported a cylinder block 7 together with input shaft 5. A plurality of pump pistons 32 are inserted into a plurality of cylinder bores bored at cylinder block 7. A movable swash plate 28 abuts against the tops of pump pistons 32. As shown in FIG. 9, movable swash plate 28 can be tilted by a lever arm 30 and a lever 31 through speed change operating arm 26 and speed change operating shaft 27. Cylinder block 7 is subjected to power and rotates through input pulley 14 and input shaft 5 so as to take in and discharge operating oil in casing M.

On the other hand, the cylinder block 8 of the hydraulic motor is supported to the side surface of manifold 4. Pressure oil from the hydraulic pump is supplied through an oil passage in manifold 4 to a plurality of cylinder bores bored in cylinder block 8. The pressure oil serves as a force to push motor pistons 33, fitted into the cylinder bores, whereby, the pushing force is converted into a torque by fixed swash plate 34 so as to rotate cylinder block 8 and output shaft 6. An oil filter 29 is disposed between the lower surface of manifold 4 and the inner bottom surface of casing half 3. The operating oil filtered by oil filter 29 is used to supply the pressure oil in the closed circuit of manifold 4. At the body frame 12 of the vehicle is fixed the casing M through the mounting bracket 2d. Swollen or enlarged region or portion 2c of casing half 2 and input pulley 14 attached to input shaft 5 are at about level with and housed within body frame 12.

Figure 7:
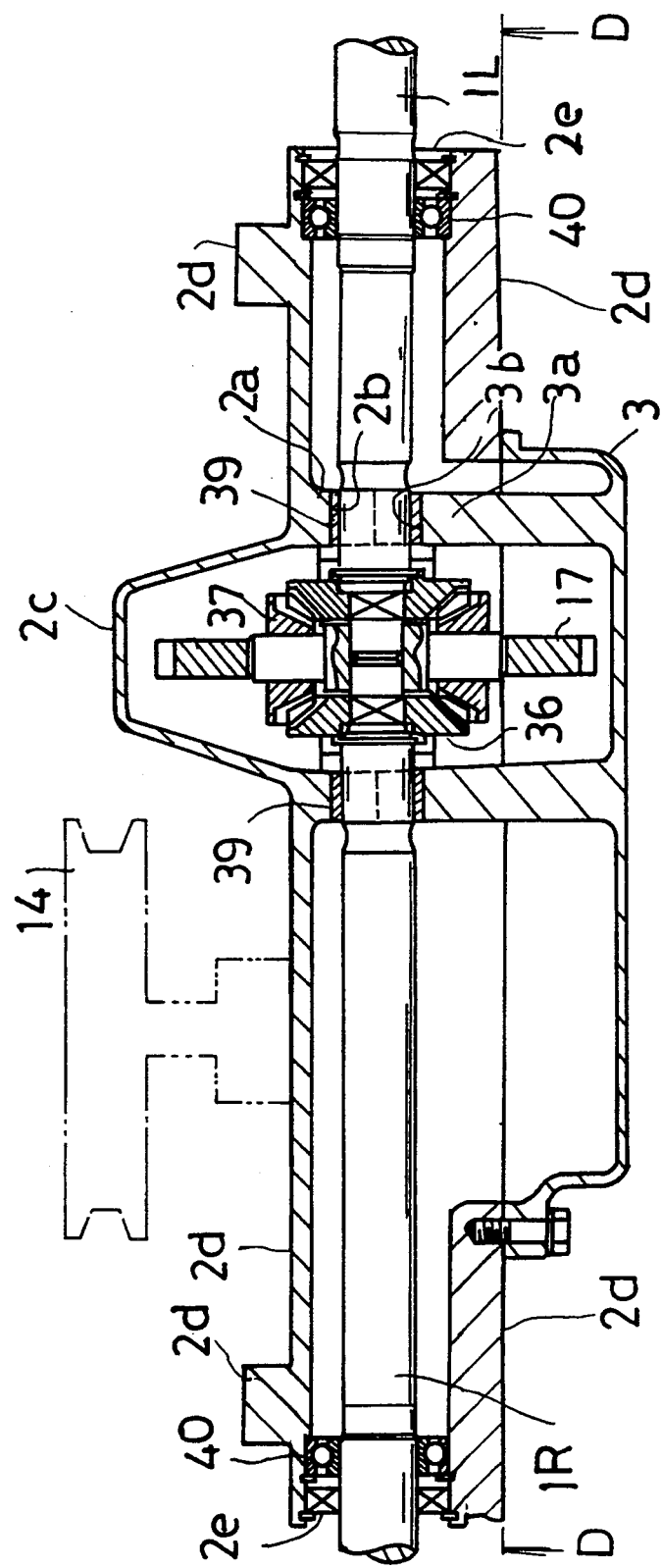
FIG. 7 is a sectional view taken on the line C—C in FIG. 3.
Figure 8:
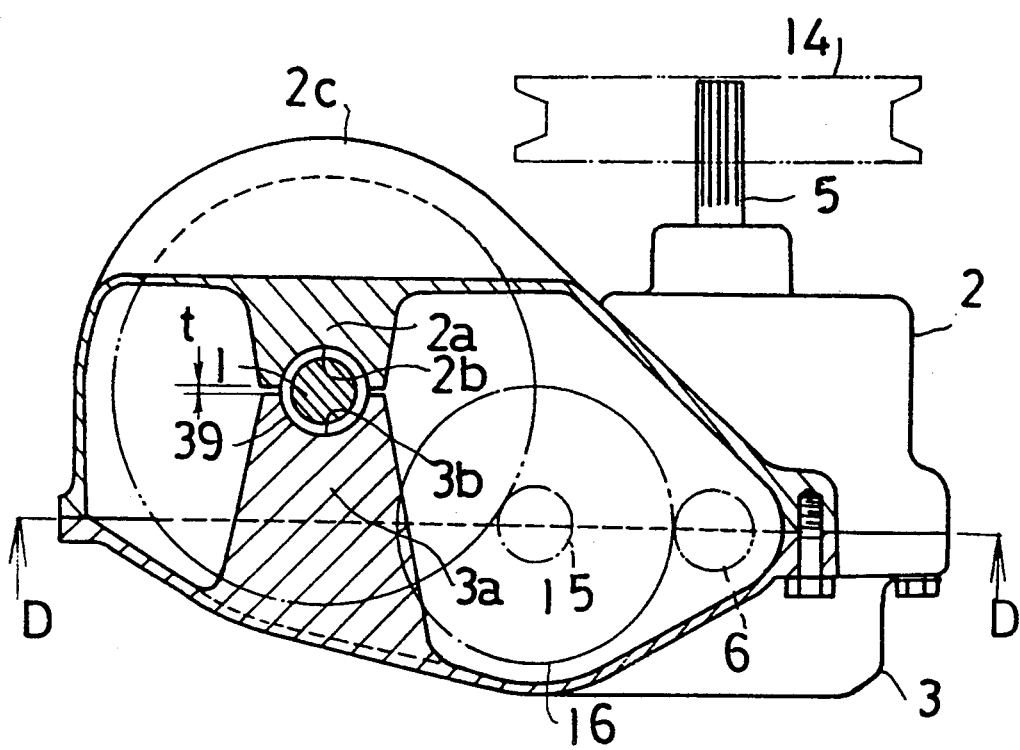
FIG. 8 is a sectional view taken on the line B—B in FIG. 5, showing a holding portion for the axle 1.

Referring to FIG. 7, in the axle driving apparatus of the present invention, the outside or distal portion of axle 1 is supported to axle housing 2e of casing half 2 through bearing 40. The inside or proximal portion of axle 1 is supported by bearings 39 sandwiched between semicircular recesses 2b formed at the holders 2a of the casing half 2 and semicircular recesses 3b formed at the projections 3a projecting from casing half 3 toward the casing half 2. Hence, the axis of axle 1 is not in the plane D—D at the junction surface between casing halves 2 and 3, rather the axes of output shaft 6 and counter shaft 15 are positioned in plane D—D as shown in FIG. 8.

If when casing halves 2 and 3 are joined, the holders 2a and projections 3a meet before the remainder of the casing, the casing halves 2 and 3 cannot be completely joined. As a result, when both casing halves are forcibly tightened, the casing M becomes loose. Therefore, as shown in FIGS. 8 and 9, when casing halves 2 and 3 are joined, a gap is formed between the utmost ends of holders 2a and projections 3a. In other words, an inner diameter of each bearing portion holding axle 1 is larger than the sum of the depths of recesses 2b and 3b.

Figure 10:
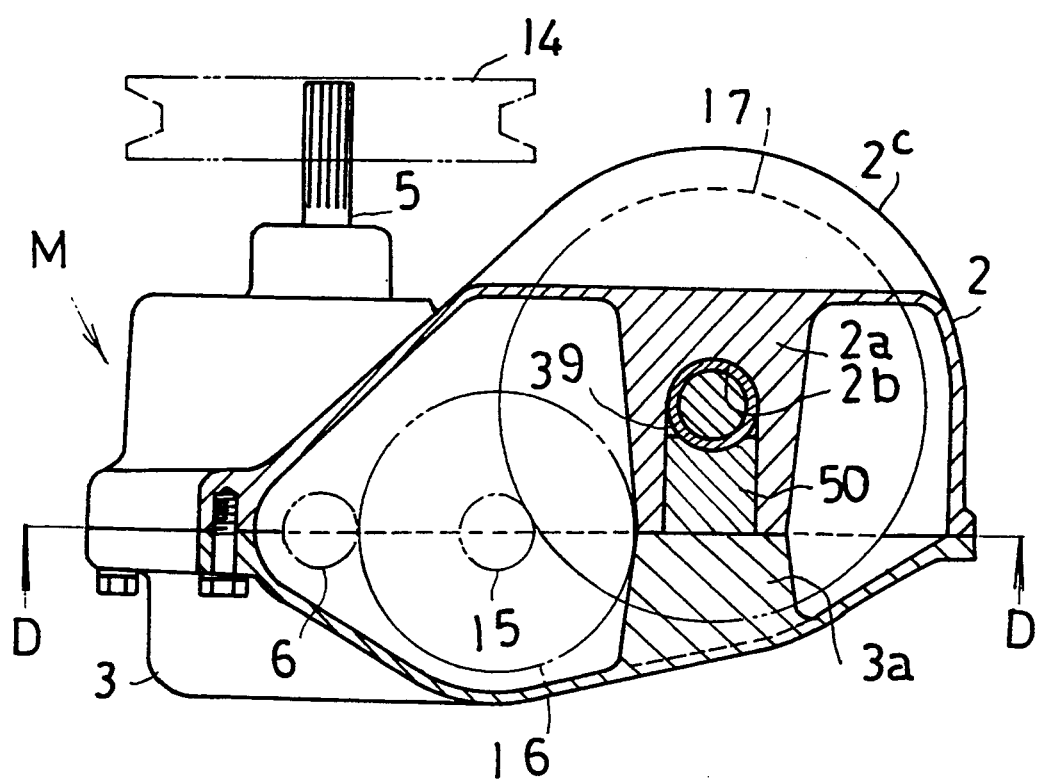
FIG. 10 is a sectional side view of a modified embodiment of construction of bearing for the axle 1.

Referring to FIG. 10, a modified embodiment of an axle holding portion is shown, in which each holder 2a at casing half 2 and each projection 3a projecting from casing half 3 extend up to the junction surface of the casing. Recess 2b at each holder 2a is made larger in depth and a bearing support 50 is inserted into the casing half 2.

Such construction also can support bearing 39 between the upper end of bearing support 50 and recess 2b, so as to journal axle 1 through bearing 39.

This embodiment is similar to the first described embodiment with respect to casing M being separated into two parts, the provision of a hydraulic non-stage transmission, and a positional relationship between output shaft 6 and axle 1. Like components are designated by like reference numerals and a detailed description thereof is omitted.

Figure 11:
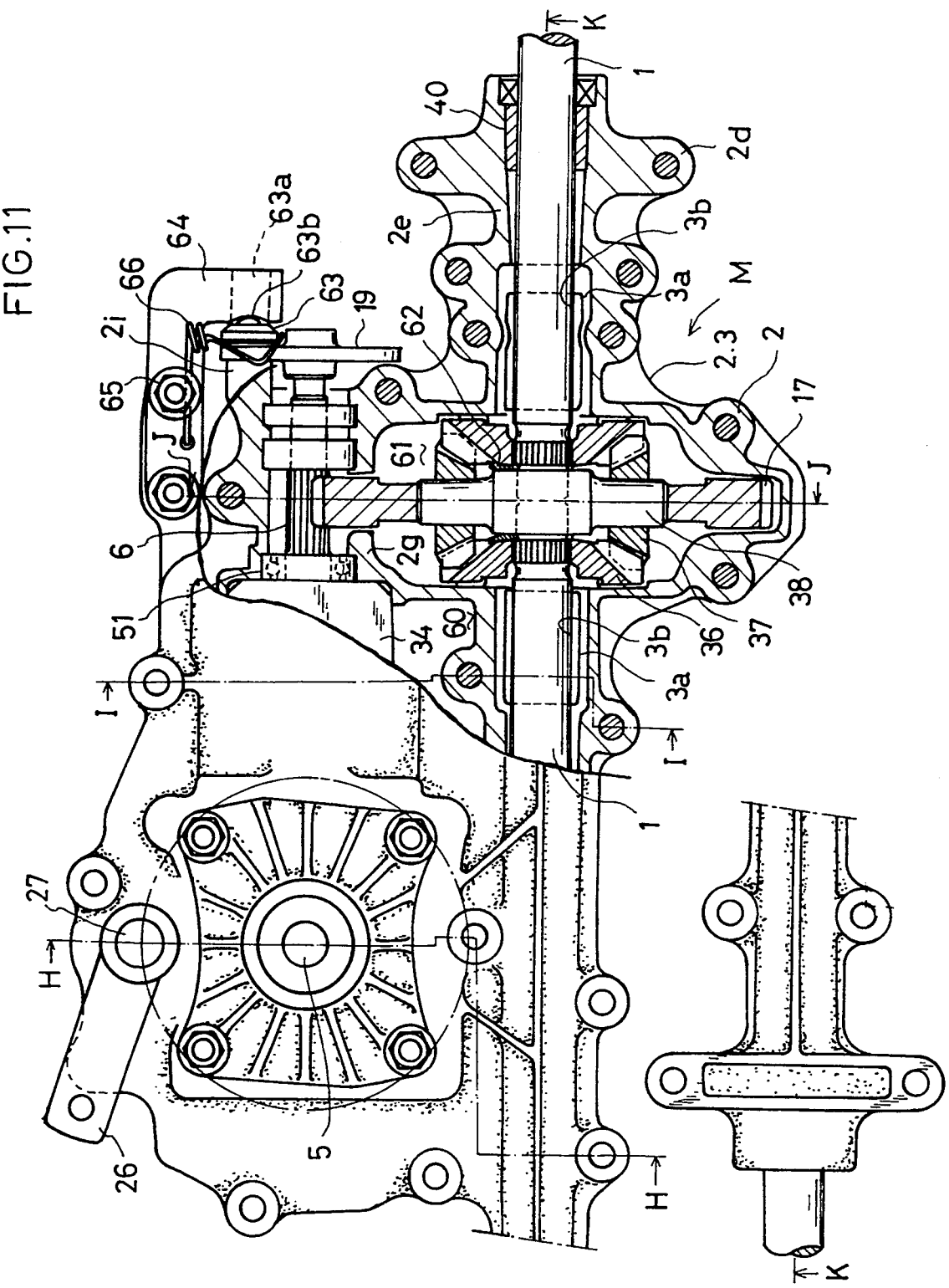
FIG. 11 is an external plan view of a second embodiment of an axle driving apparatus of the present invention, partially cutaway at the casing half 2 by the plane including the axis of the axle 1.
Figure 12:
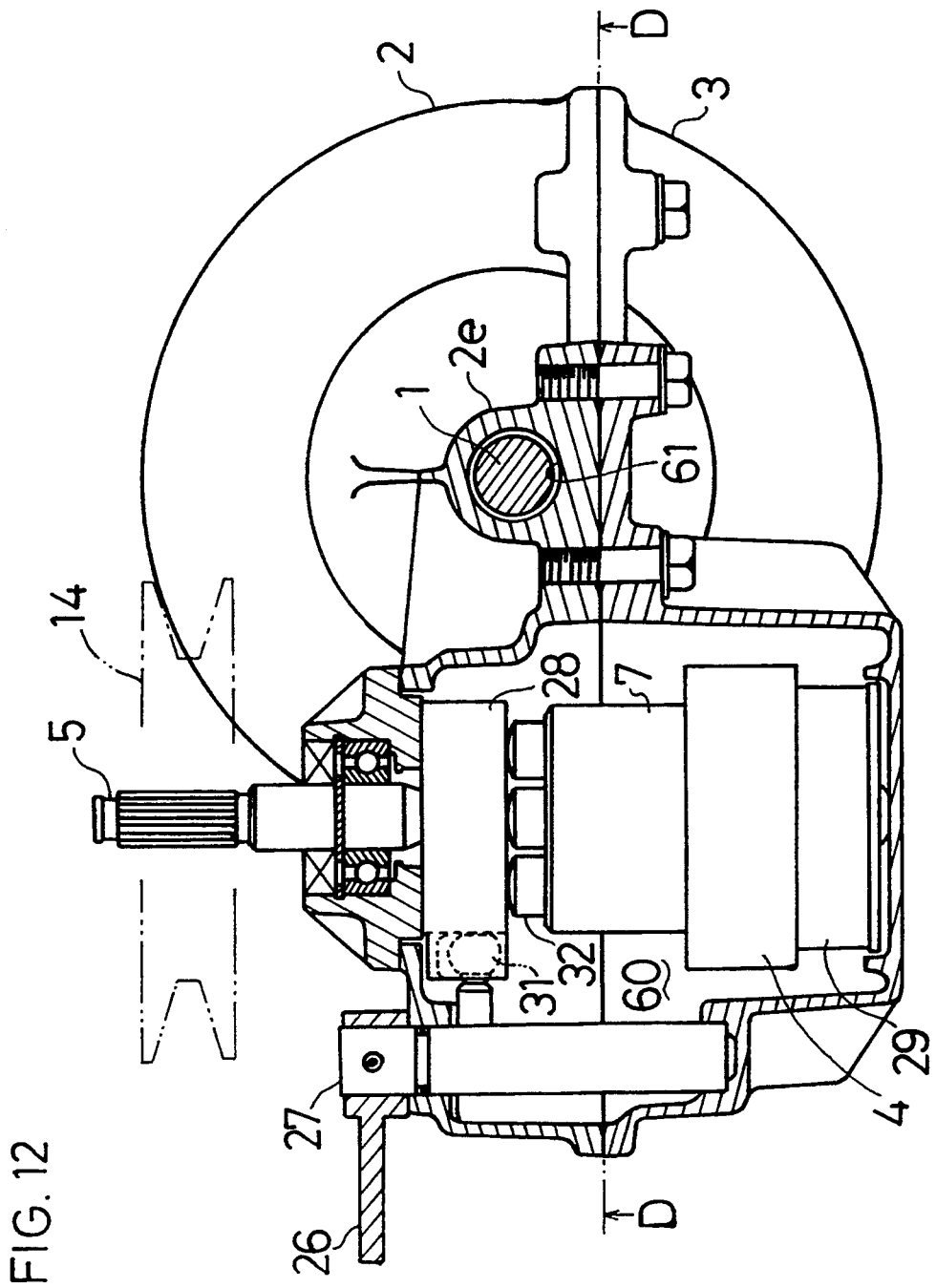
FIG. 12 is a sectional view of the axle driving apparatus taken on the line H—H in FIG. 11.

FIG. 11 is an exterior plan view of the second embodiment of the axle driving apparatus of the present invention in which casing half 2 is partially cutaway at the plane including the axis of axles 1. In this embodiment a hydraulic motor of the hydraulic non-stage transmission type is larger in capacity than the hydraulic pump to thereby obtain hydraulic speed reduction. Therefore, the counter shaft shown in the first embodiment is omitted and gear 35 at output shaft 6 directly engages with ring gear 17 of the differential gear.

Casing M is partitioned into a chamber 60 for housing therein the hydraulic non-stage transmission and a chamber 61 housing therein the differential gear and axles 1. A sealing bearing 51 is used for supporting output shaft 6 so that oil is prevented from moving in reciprocation between the hydraulic motor and gear 35, that is, between the chambers 60 and 61. Thus, the operating oil for the hydraulic non-stage transmission fills chamber 60 and the lubricating oil for the differential gear and axles 1 fills chamber 61.

Figure 13:
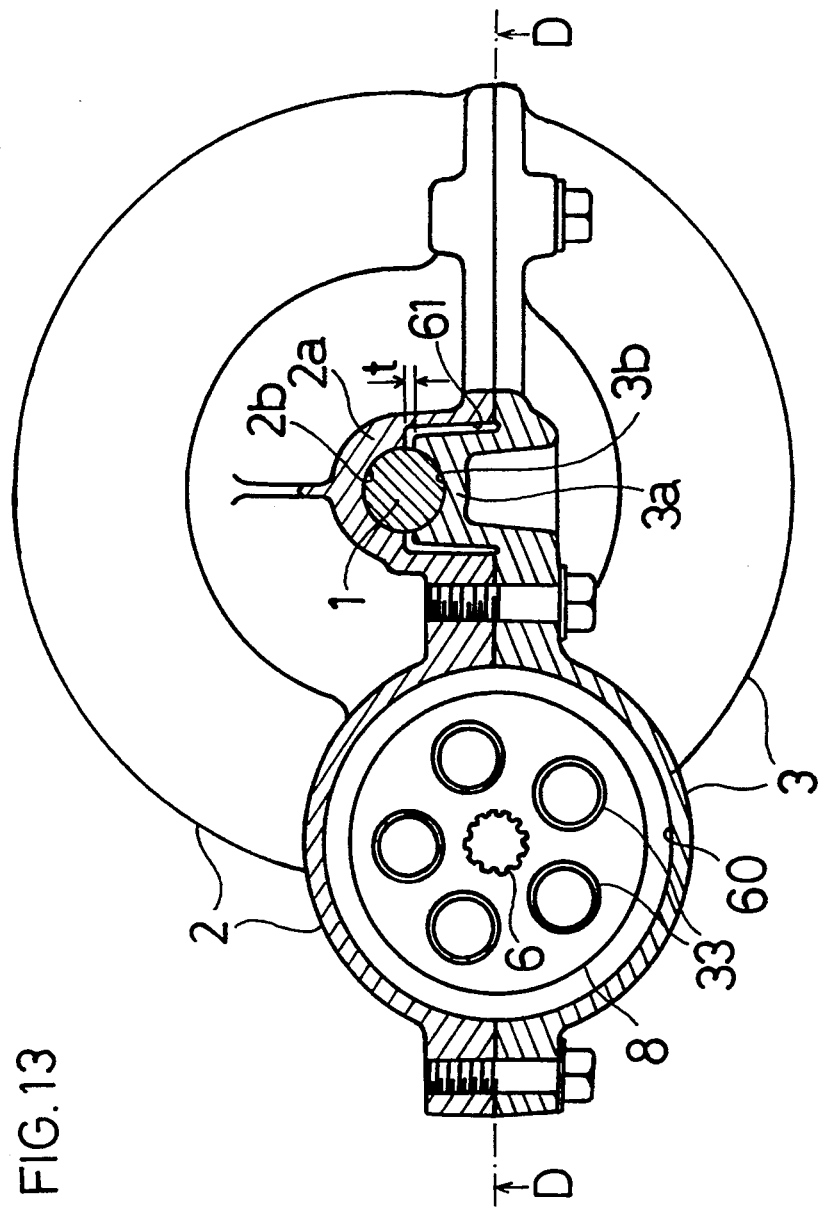
FIG. 13 is a sectional view of the same taken on the line I—I in FIG. 11.
Figure 14:
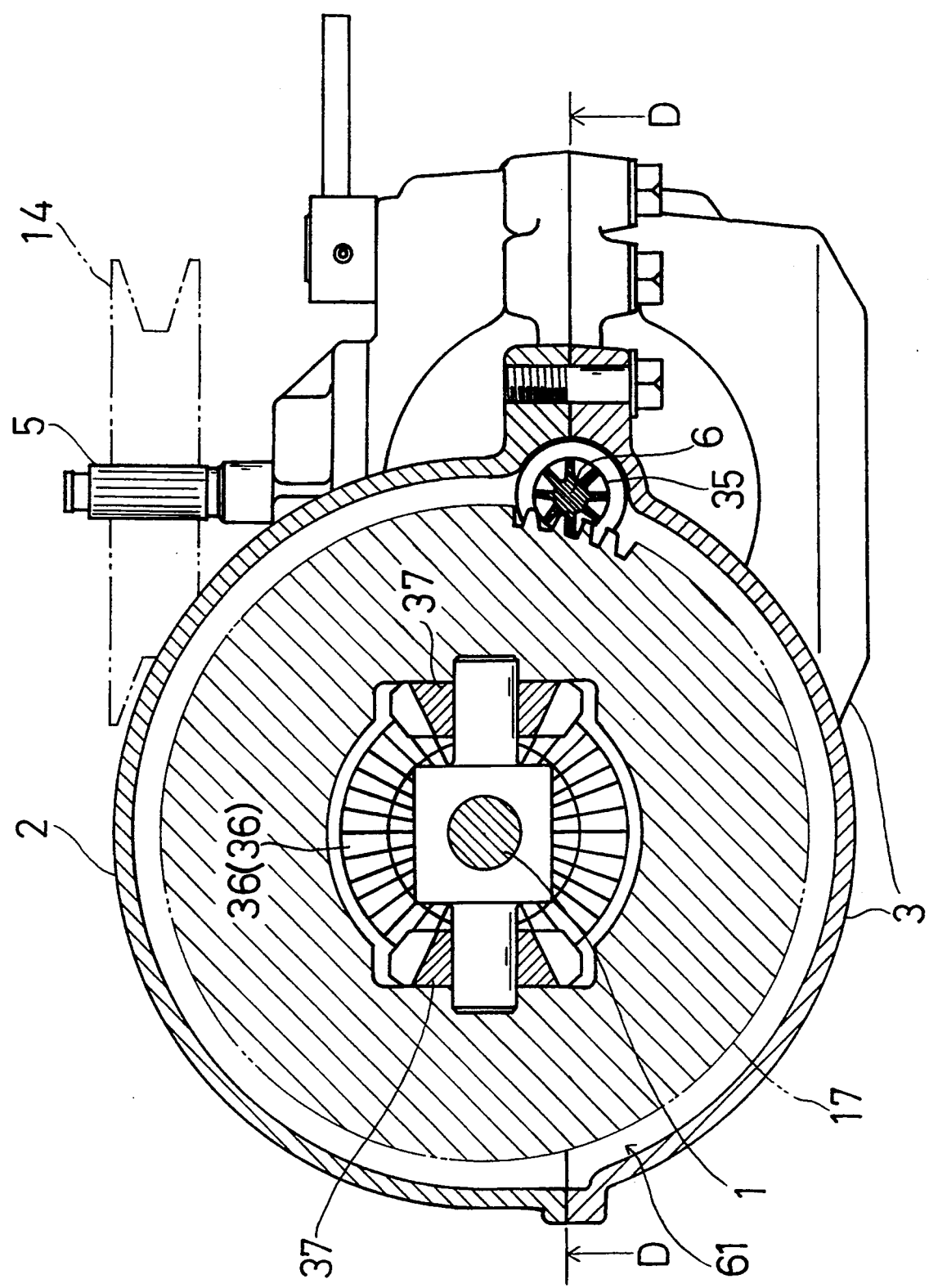
FIG. 14 is a sectional view of the same taken on the line J—J in FIG. 11.
Figure 15:
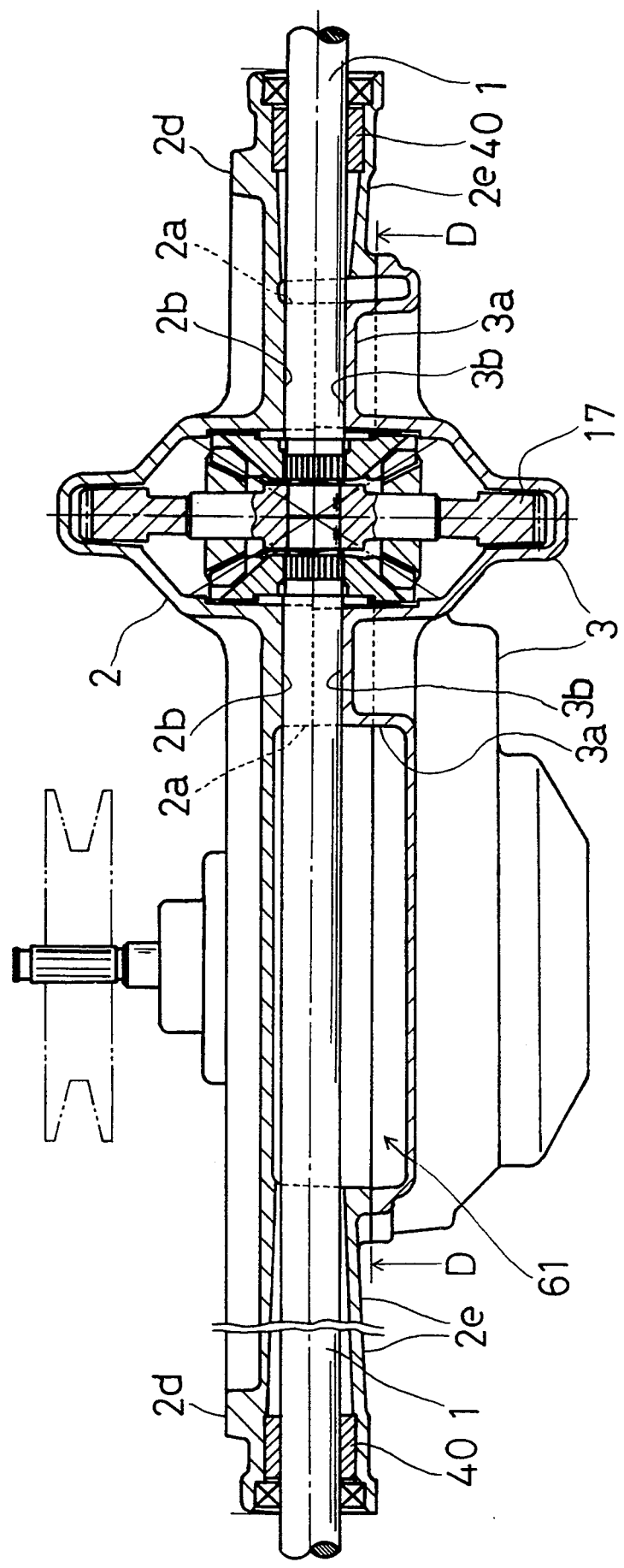
FIG. 15 is a sectional view of the same taken on the line K—K in FIG. 11.

The support for the inside or proximal portion of the axle in this embodiment is best seen in FIG. 13. A semicircular recess 2b is formed at a holder 2a and a semicircular recess 3b is formed at projection 3a, so that the holding portion is directly held by recesses 2b and 3b without using a bearing as in the first embodiment. Between the utmost ends of holder 2a and projection 3a is provided a gap t, as in the first embodiment. Lubricating oil sufficiently reaches the frictional portion of the transmission through gap t.

Bearing 40, for supporting the outside or distal portion of axle 1, uses a bush type bearing and is disposed at the outer end of a hollow of the axle housing 2e. The hollow, which is not formed by mechanical machining, but rather, is casted during molding of casing half 2, is tapered inwardly of casing half 2.

Figure 16:
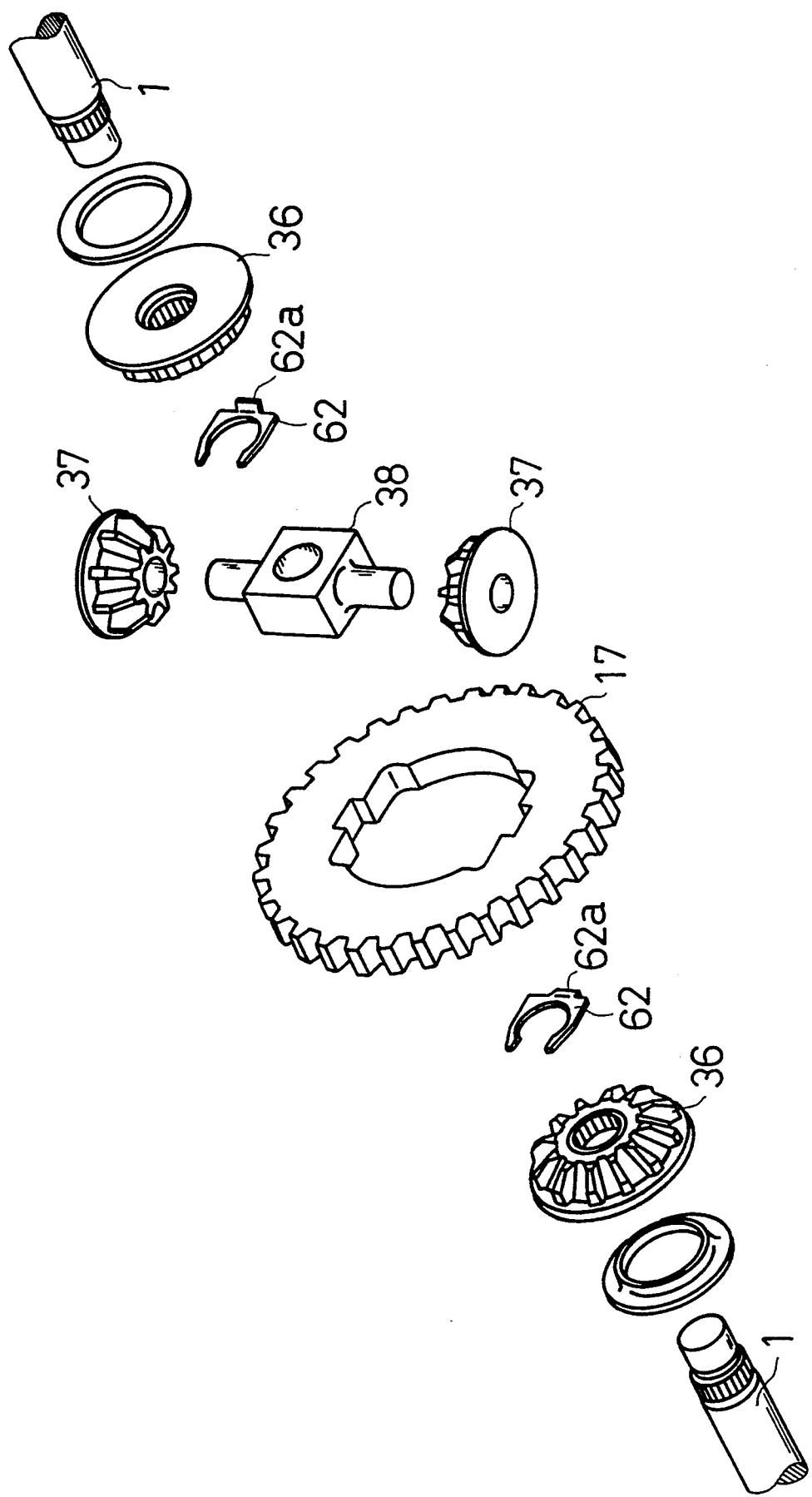
FIG. 16 is a perspective exploded view of a differential gear.

Again referring to FIG. 11 and the differential gear and axles 1, a pinion shaft 38 pivotally supporting a pinion 37 is fitted into a ring gear 17. Assembly of the pinion 37 engaging with differential side gears 36 is held in chamber 61. Axles 1 are inserted therein through axle housings 2e and are coupled in spline with differential side gears 36, respectively. Snap rings 62, shaped as shown in FIG. 16, are inserted between axles 1 and pinion shaft 38 and are retained into grooves at axles 1 respectively, thereby completely positioning axles 1. Snap rings 62 each have a tongue 62a bent outwardly in part and engaged with a groove provided at each side gear 36 so as to prevent snap ring 62 from escaping from the respective axles 1.

Figure 17:
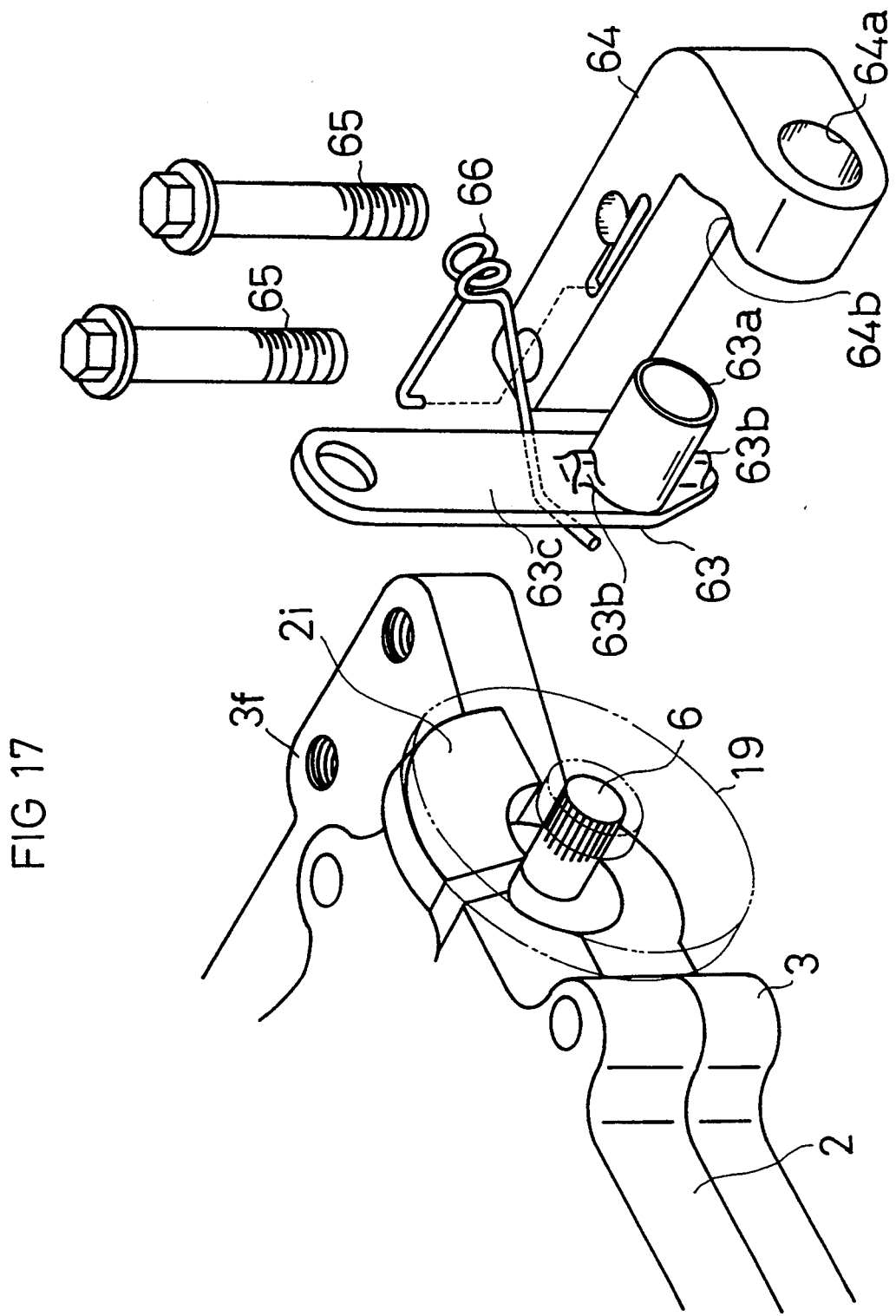
FIG. 17 is a perspective exploded view of a brake device.

Next, explanation will be given on a braking device of the axle driving apparatus. At the end of output shaft 6 is fixed a rotary disk brake type member 19. A biasing member 63 is disposed at the front side of member 19 and a fixed braking surface 2i projects from casing half 2 at the rear side of the same. Biasing member 63, as shown in FIG. 17, comprises a pivotal shaft 63a, a pair of cam projections 63b, and an arm 63c connected to a brake operating member (not shown). A bracket 64 for supporting the biasing member 63 is tightened to a disposing surface 3f for disposing casing half 3 through two bolts 65. Bracket 64, having a bore 64a into which the pivotal shaft 63a is fitted and a cam groove 64b with which the cam projection 63b comes into slidable contact. When arm 63c is subjected to an external force and biasing member 63 rotates around pivotal shaft 63a, cam projections 63b ride on a shallow portion of cam groove 64b from a deep portion thereof and biasing member 63 moves in the direction of pushing member 19, thereby exerting a braking action to member 19 between fixed braking surface 2i and member 19. An elastic wire rod 66 is fixed at its base to bracket 64 and is bent at an idle end to abut against both axial ends of arm 63. Hence, when no external force is applied thereto, cam projections 63b are biased to be positioned at the deep portion of cam groove 64b.

Each casing half 2 or 3 is preferably molded by use of a casting method, such as aluminum die-cast, thereby reducing mechanical machining cost.

The present invention has the following advantages:

Since axles 1 are journalled to one casing half 2, the axles 1 are not positioned at the junction surface D—D. Thereby, even if casing half 3 is removed, axles 1 remain in one casing half 2, thereby facilitating assembly and dismantling of the hydraulic non-stage transmission.

Since the axis of each axle 1 is not on the junction surface D—D of casing M, but is in one casing half and the axis of output shaft 6 connected in association with axle 1 is disposed on the junction surface D—D, the interval between axle 1 and output shaft 6 when viewed in plan can be reduced. Hence, a compact axle driving apparatus is obtainable. Since the bearing for axle 1 is provided in a single casing half, the rigidity of the bearing is improved. For maintenance and inspection of the hydraulic non-stage transmission, while axles 1 remain in one casing half, the other casing half need only be removed, thereby enabling the hydraulic non-stage transmission to be simply dismantled or assembled.

The hydraulic non-stage transmission is constructed so that the axes of input shaft 5 and output shaft 6 intersect approximately perpendicularly with each other, and axles 1 are pivoted to casing half 2 for supporting the input shaft 5. Because the axis of axle 1 is nearer to the axial end of input shaft 5 of the hydraulic non-stage transmission, the volume of casing half 3 which does not support input shaft 5 can correlatively be reduced.

Also, input pulley 14 is fixed to input shaft 5 and is connected in association with engine 11 through belt transmitting mechanism 13. Swollen portion 2c for housing the differential gear connecting the left and right axles 1 is formed in one casing half 2 in a manner of superposing with respect to pulley 14 when viewed laterally. In other words, since input pulley 14 at input shaft 5 can be lowered relative to axle 1, the center of gravity of engine 11 loaded on the vehicle can be disposed in a lower position and a stable vehicle with a low center of gravity can be obtained. Also, the hydraulic non-stage transmission, which is disposed in a relatively lower position in casing M with respect to the axle 1, can be immersed in oil within casing M, and the closed circuit of the hydraulic non-stage transmission can be prevented from taking in air, whereby the phenomenon of cavitation can be avoided and the performance of the axle driving apparatus can be improved.

Outside casing half 2 are integrally provided axle housing 2e approximately coaxially with axles 1 so as to support axles 1. The other casing half 3 is made asymmetrical with respect to casing half 2 and of diminished volume, whereby, casing half 2 is strong enough to support axles 1 and casing half 3 can be simple lid smaller in volume and of an oil-pan-like shape in comparison with casing half 2. Mounting brackets 2d can be provided to improve the strength of axle housing 2e.

The outside portion of each axle 1 is supported by bearing 40 held to axle housing 2e and the inside portion of the same is supported by the holding portion formed by the junction of the two casing halves, whereby, bearing 40 provided at axle housing 2e temporarily holds each axle 1 at a side of casing half 2. Casing half 3 is joined with casing half 2 so that axles 1 are completely supported within casing M, thereby simplifying the assembly of axles 1.

The above-mentioned holding portion is formed in such a manner that recess 2b of holder 2a provided within casing half 2 and recess 3b of projection 3a provided within casing half 3 are opposite to each other, whereby recesses 2b and 3b can integrally and simultaneously be formed when the casing halves are molded respectively and the holding portion is simple in construction.

In addition, the holding portion may support axles 1 through bearing 39 as shown in the first embodiment, or directly and not through the bearing as shown in the second embodiment.

An inner diameter of the holding portion is set larger than the sum of the depths of recesses 2b and 3b, so that a gap t is formed between the utmost ends of holder 2a and projection 3a when coupling casing halves 2 and 3. Whereby, even without accurately machining the depths of recesses 2b and 3b, the collision of holders 2a and projections 3a with each other making it impossible to join casing halves 2 and 3 is avoided, thereby ensuring casing M is completely sealed.

The transmission means for connecting output shaft 6 of the hydraulic non-stage transmission in association with axles 1 uses a spur gear. However, a bevel gear or an endless band, such as a belt or a chain, may be used instead of the spur gear.

Furthermore, the hydraulic non-stage transmission shown housed within casing M, is only one example of a mechanism for steplessly speed-change-driving axles 1. Alternatively, the axle driving apparatus can house therein a mechanical non-stage transmission, a mechanical transmission in need of stepwise speed-change-driving the axles, or a speed reduction mechanism only for driving the same, would not depart from the principle of the present invention.

What is claimed is:

1. An axle driving apparatus, comprising:
   first and second casing sections joined along a junction surface to form a casing, wherein the junction surface of said first and second casing sections lies in a first plane;
   a hydraulic non-stage transmission disposed within said casing having an input shaft to which engine power is transmitted from an engine and an output shaft through which said engine power is transmitted out of said transmission, wherein the longitudinal axis of said output shaft lies along said first plane;
   an axle rotatably supported within one of said first and second casing sections, wherein the longitudinal axis of said axle lies in a second plane different from said first plane, wherein said casing provides a housing for both said transmission and said axle; and
   a transmission means connecting said output shaft and said axle.

2. An axle driving apparatus according to claim 1, wherein said second plane is parallel to said first plane.

3. An axle driving apparatus according to claim 1, wherein said input shaft is rotatably supported by said casing and the longitudinal axis of said input shaft is perpendicular to said longitudinal axis of said axle.

4. An axle driving apparatus according to claim 3, wherein said casing further comprises:
   an enlarged region;
   a gear for driving said axles housed within said enlarged region; and
   an input pulley for inputting engine power from a belt transmission mechanism to said hydraulic non-stage transmission disposed adjacent said enlarger region.

5. An axle driving apparatus according to claim 1, wherein said transmission means comprises:
   a counter shaft disposed between said output shaft and said axle, wherein the longitudinal axis of said countershaft lies along said first plane.

6. An axle driving apparatus, comprising:
   first and second casing section joined along a junction surface to form a casing, wherein the junction surface of said first and second casing sections lies in a first plane;
   a hydraulic non-stage transmission disposed within said casing having an input shaft to which engine power is transmitted from an engine and an output shaft through which said engine power is transmitted out of said transmission;
   an axle rotatably supported within one of said first and second casing sections, wherein the longitudinal axis of said axle lies in a second plane different from said first plane, wherein said casing provides a housing for both said transmission and said axle; and
   a countershaft disposed between said output shaft and said axle, wherein the longitudinal axis of said countershaft lies along said first plane.

7. An axle driving apparatus according to claim 6, wherein said second plane is parallel to said first plane.

8. An axle driving apparatus according to claim 6, wherein said input shaft is rotatably supported by said casing and the longitudinal axis of said input shaft is perpendicular to said longitudinal axis of said axle.

9. An axle driving apparatus comprising:
first and second casing sections joined along a junction surface to form a casing, wherein the junction surface of said first and second casing sections lies in a first plane;
a hydraulic non-stage transmission disposed within said casing having an input shaft to which engine power is transmitted from an engine and an output shaft through which said engine power is transmitted out of said transmission, wherein the longitudinal axis of said output shaft lies along said first plane;
an axle, rotatably supported therefor one of said first and second casing sections, wherein the longitudinal axis of said axle lies in a second plane, different from said first plane; and
wherein said casing provides a housing for both said transmission and said axle.

10. An axle driving apparatus according to claim 9, wherein said second plane is parallel to said first plane.

11. An axle driving apparatus according to claim 9, wherein said input shaft is rotatably supported by said casing and the longitudinal axis of said input shaft is perpendicular to said longitudinal axis of said axle.

12. An axle driving apparatus according to claim 9, further comprising:
a counter shaft disposed between said output shaft and said axle, wherein the longitudinal axis of said countershaft lies along said first plane.

13. An axle driving apparatus according to claim 9, further comprising: p1 means, disposed within said casing, for holding a distal portion of said axle; and
means, disposed within said casing, for holding a proximal portion of said axle.

14. An axle driving apparatus according to claim 13, wherein said means for holding a distal portion of said axle comprises:
an axle housing including a hollow; and
a bearing fitted into said hollow.

15. An axle driving apparatus according to claim 14, wherein said axle housing projects outwardly from a side wall of said casing and is integral therewith.

16. An axle driving apparatus according to claim 13, wherein said means for holding a proximal portion of said axle comprises:
a holder formed along one of said first and second casing sections; and
a projection formed along the other of said first and second casing sections, wherein said first and second casing sections are disposed opposite to each other.

17. An axle driving apparatus according to claim 16, further comprising:
a first substantially semicircular recess formed in said holder; and
a second substantially semicircular recess provided at the utmost end of said projection, wherein said projection extends beyond the junction surface of said casing.

18. An axle driving apparatus according to claim 17, further comprising:
a bearing sandwiched between said first and second substantially semicircular recesses, whereby said axle is supported by said casing through said bearing, and wherein the outer diameter of said bearing is larger than the total depth of said first and second substantially semicircular recesses.

19. An axle driving apparatus according to claim 17, wherein said axle is directly supported by said first and second semicircular recesses and wherein the outer diameter of said axle is larger than the total depth of said first and second substantially semicircular recesses.

* * * * *